June 9, 1953  F. F. LINN  2,641,464
VEHICLE AXLE
Filed Sept. 26, 1950
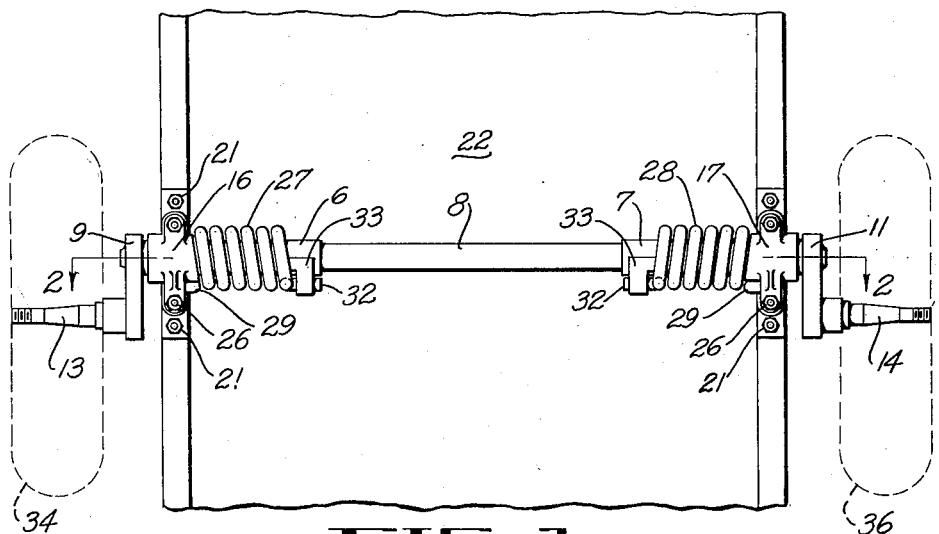
FIG_1_
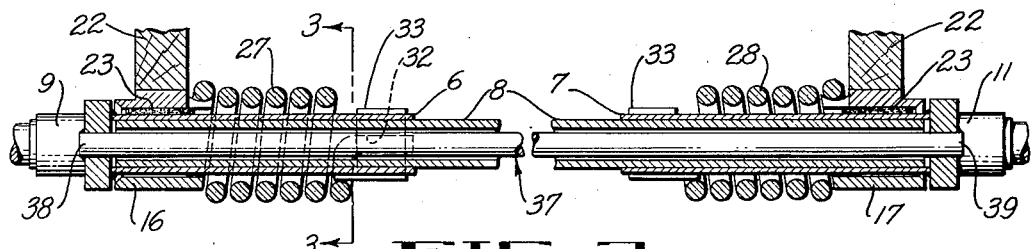
FIG_2_
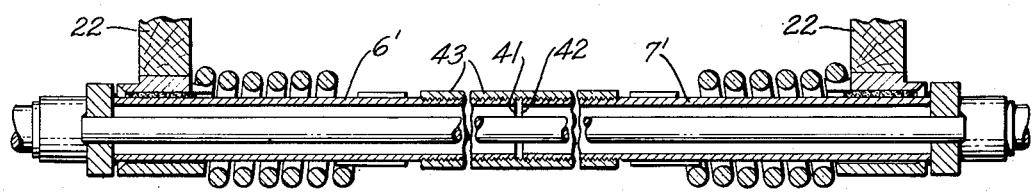
FIG_4_
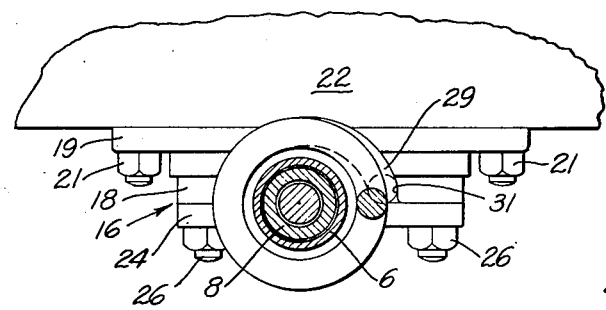
FIG_3_
INVENTOR.
FRANK F. LINN
BY Manfred M. Warren
his Attorney Patented June 9, 1953

2,641,464

UNITED STATES PATENT OFFICE 2,641,464

VEHICLE AXLE

Frank F. Linn, Venice, Calif., assignor, by mesne assignments, to Daisy A. Linn and John B. Long, as trustees Application September 26, 1950, Serial No. 186,745

6 Claims. (Cl. 267—11)

The invention relates to axles and wheel suspension means for vehicles and, more particularly, to the so-called "level load" type of axle, such as is more fully described and claimed in my earlier Patents No. 2,426,513, issued August 26, 1947, and No. 2,455,787, issued December 7, 1948.

The various advantages of the level load type of axle, such as the provision of a level load bed or platform in loading or in movement even when the load shifted to one side of the platform, the retaining of the load platform in a level condition in rounding a corner, and the attaining of a much lower center of gravity for the load, are all well understood in the art.

An object of the present invention is to provide a vehicle axle which retains all of the inherent advantages of the level load type of axle and which, in addition, will provide an improved softness of spring action such as is afforded by individual wheel suspension.

Another object of the invention is to provide a vehicle axle of the character described which combines the advantages of the level load and individual wheel suspension types with the use of a minimum number of parts which are designed for ready and simple manufacture and assembly and which will be capable of withstanding, over a very long useful life, the heavy loads and severe road shock conditions for which the axle is designed.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a bottom view of a vehicle axle constructed in accordance with the present invention.

Figure 2 is a longitudinal cross-sectional view taken substantially on the plane of line 2—2 of Figure 1.

Figure 3 is a cross-sectional view of the axle taken substantially on the plane of line 3—3 of Figure 2.

Figure 4 is a longitudinal sectional view similar to Figure 2 but showing a modified form of the invention.

The vehicle axle of the present invention, in its preferred embodiment, as illustrated in Figures 1 to 3 of the accompanying drawing, consists of a pair of hollow shafts 6 and 7 mounted in co-axial, endwise aligned relation upon the outer ends of a tube 8. Secured to the outer ends of shafts 6 and 7 and extending radially therefrom, are arms 9 and 11 which, in turn, support adjacent their free ends, wheel spindles 13 and 14, the latter extending from the arms in spaced substantially parallel relation to the axis of the tube 8 and shafts 6 and 7. The arms 9 and 11 are preferably of identical construction so as to position the spindles 13 and 14 at equal distances from the axis of rotation and with the spindles extending outwardly from the arms in substantially aligned position.

The shafts 6 and 7 are mounted on the tube 8 for relative rotation and are, in turn, journalled in bearings 16 and 17 surrounding the shafts 6 and 7 adjacent their outer ends but inwardly of arms 9 and 11. The bearings are each preferably composed of a body section 18, see Figure 3, formed with a concave recess adapted to overlie the shafts and having an extended base flange 19 provided with openings for bolting, as by bolts 21 to the underside of a vehicle body 22. Preferably, a shell type bearing insert 23 (see Figure 2) is positioned within the concave recess of the body section 18 so as to provide the bearing surface of the body section on the shafts. With reference again to Figure 3, it will be seen that the bearing is enclosed by a cap section 24 having a complementary concave recess adapted to underlie the lower half of the shaft periphery and which is secured as by bolts 26 to the body section 18.

Load supporting springs 27 and 28 are connected between the shafts 6 and 7 and have a connection to bearings 16 and 17 so as to resiliently resist rotative movement of the shafts in the bearing in response to the rotational deflection of the arms 9 and 10 under load conditions. These springs are preferably of helical form mounted concentrically upon and around the shafts 6 and 7 adjacent to the bearings 16 and 17. One end 29 of each of the springs is bent longitudinally from the adjacent spring coil and is inserted into a longitudinal opening 31 in the base section of the bearing. The opposite end 32 of each of the springs is secured to a spring clip 33 which is affixed, as by welding, to the shaft 6 and 7 adjacent their inner ends.

As will be clear from the foregoing, each of the shafts 6 and 7 and its connected arm and wheel spindle is journalled upon the tube 8 and within its bearing 16—17 for independent rotation relative to the other shaft and connected arm and spindle. In this manner, as will be understood, individual wheel suspension is achieved whereby either of the wheels 34 and 36 mounted on the spindles 13 and 14 may be displaced and respond to road shock without transmitting such shock to the other wheel.

In accordance with the present invention, and as a principal feature thereof, there is combined with the individual wheel suspension arrangement above described, the features of a level load axle. This is accomplished by connecting the independently mounted shafts 6 and 7 with a spring means 37 which resiliently resists relative rotation of the shafts 6 and 7 with respect to one another. Thus, under normal conditions the arms 9 and 11 and their spindles 13 and 14 tend to move together so that the arms 9 and 11 will endeavor to remain in parallelism. Accordingly, in loading the vehicle, the load platform will at all times endeavor to remain horizontal or parallel to the road surface even though there is an uneven load distribution on the platform. In the usual individual wheel suspension arrangement, the placing of the majority of the load closer to one wheel than the other will cause the platform to lower more at the loaded side than at the relatively unloaded side. In the present construction, however, spring means 37 constantly urges an equal rotative deflection of the shafts 6 and 7, whereby the load platform is maintained level notwithstanding an unequal load distribution thereon.

Preferably, the spring means 37 is composed of an elongated torsional bar having its opposite ends 38 and 39 secured to the outer ends of the shafts 6 and 7 by anchoring the ends of the torsional element to the arms 9 and 11. The latter may be conveniently formed with openings aligned with the axis of the tube 8 for receiving the opposite ends 38 and 39 of the torsional element and the ends of the element may be conveniently welded to the arms at their outer sides as illustrated in Figure 2. The elongated bar 37 may be formed of spring steel of either round or polygonal form and should be of a size capable of applying a sufficient resilient force to the shafts to accomplish the level load functions above described. As will be understood, a relative rotation of shafts 6 and 7 with respect to each other will be resiliently resisted by the torsional or twisting strain of the spring 37 and thereby the spring 37 constantly endeavors to cause the shafts 6 and 7 to rotate in unison. In operation, however, under dynamic or moving conditions road shock imparted exclusively to one of the shafts will cause a resilient deflection of the torsional member thereby permitting a desired amount of individual wheel suspension. Stated in another way, it will be observed that since the opposite ends of the torsional element are secured to the shafts 6 and 7, each of the shafts functions as an anchorage for its end of the torsional element thereby placing the full length of the torsional element in operation when the road shock is present at one of the wheels. For example, should wheel 36 strike a bump in the road during the movement of the vehicle, there will be an upward displacement of spindle 14 accompanied by a counterclockwise rotation of shaft 7 as viewed from the right hand end of Figure 1. Assuming that there is no road shock then incident on wheel 34, shaft 6 will tend to anchor against rotation the left hand end 38 of the torsional bar. Thus, the rotation of shaft 7 places the torsional bar 37 under a torsional stress over its full length thereby setting up a resilient resistance to the rotation of shaft 7 augmenting the resilient resistance supplied by spring 28. Likewise, in the displacement of wheel 34 in response to road shock, shaft 7 serves as an anchorage for the right hand end 39 of the torsion bar thereby putting the bar under torsional stress over its full length to resiliently resist the rotation of shaft 6 in cooperation with the resilient resistance offered by spring 27.

A modified form of the invention is illustrated in Figure 4 wherein a different type of means is employed for supporting the shafts 6' and 7' in endwise axial alignment and for relative rotation. As illustrated in Figure 4 the hollow shafts 6' and 7' are made somewhat longer than in the first described embodiment so that their inner ends 41 and 42 are brought into opposed relation and are held in alignment by means of a surrounding sleeve 43. Preferably, the shaft ends 41 and 42 are externally threaded and are threadably engaged by internal threads provided on the sleeve 43 whereby relative rotation of the shafts is permitted while the shafts are firmly held in longitudinal alignment. The remainder of the axle structure is the same as that described in connection with the above embodiment. If desired a plain sleeve may be used and in which case the sleeve should have a length extending approximately to the clips so as to prevent undue longitudinal shift.

I claim:

1. A vehicle axle comprising, a pair of shafts, means connecting said shafts in endwise alignment for relative rotation about a common central axis, wheel spindles carried by said shafts in spaced substantially parallel relation to said axis, bearings surrounding and journalling said shafts for rotation and formed for attachment to a vehicle body to be supported by said axle, helical springs surrounding said shafts and having their opposite ends connected to said shafts and said bearings to resiliently resist rotative movement of said shafts in said bearings, and a torsional member having its opposite ends secured to said shafts to resiliently resist relative rotation of said shafts with respect to each other.

2. A vehicle axle comprising, a pair of hollow shafts, means supporting said shafts in endwise alignment and for relative rotation about a common central axis, arms secured to and extending radially from the outer ends of said shafts, wheel spindles carried by said arms in spaced substantially parallel relation to said axis, bearings surrounding and journalling said shafts and formed for attachment to a vehicle body, helical springs surrounding said shafts and having their opposite ends connected to said shafts and said bearings and resiliently resisting relative rotation therebetween, and a torsional member mounted axially through said shafts and secured at its opposite ends to said arms to resiliently resist relative rotation of said shafts with respect to each other.

3. A vehicle axle comprising, a tube, hollow shafts journalled for rotation on the opposite ends of said tube, wheel spindles carried by said shafts in spaced substantially parallel relation to the axis of said tube, bearings surrounding and journalling said shafts and formed for attachment to a vehicle body to be supported by said axle, helical springs surrounding said shafts and having their opposite ends connected to said shafts and bearings and resiliently resisting rotation of said shafts in said bearings, and an elongated torsional member mounted through said tube and shafts and having its opposite ends connected to said shafts and resiliently resisting relative rotation of said shafts with respect to each other.

4. A vehicle axle comprising, a tube, hollow shafts journalled for rotation on the opposite ends of said tube, arms secured to and extending radially from the outer end of said shafts, wheel spindles carried by said arms in spaced substantially parallel relation to the axis of said tube, bearings surrounding and journalling said shafts and formed for attachment to a vehicle body to be supported by said axle, helical springs surrounding said shafts on the side of said bearings opposite to said arms and having their opposite ends connected to said shafts and said bearings to resiliently resist rotative movement of said shafts in said bearings, and a torsional member mounted within said tube and having its opposite ends secured to said arms to resiliently resist relative rotation of said shafts with respect to each other.

5. A vehicle axle comprising, a pair of tubular shafts, a sleeve surrounding adjacent ends of said shafts for supporting said shafts in endwise alignment and for relative rotation about a common central axis, wheel spindles carried by said shafts adjacent their outer ends in spaced substantially parallel relation to said axis, bearings surrounding and journalling said shafts for rotation and formed for attachment to a vehicle body to be supported by said axle, helical springs surrounding said shafts and having their opposite ends connected to said shafts and said bearings and resiliently resisting rotation of said shafts relative to said bearings, and a torsional member having its opposite ends secured to said shafts and resiliently resisting relative rotation of said shafts with respect to each other.

6. A vehicle axle comprising, a pair of tubular shafts, a sleeve threaded onto adjacent ends of said shafts to support said shafts in endwise alignment and for relative rotation about a common central axis, arms secured to and extending radially from the outer ends of said shafts, wheel spindles carried by said arms in spaced substantially parallel relation to said axis, bearings surrounding and journalling said shafts and formed for attachment to a vehicle body to be supported by said axle, helical springs surrounding said shafts and having their opposite ends connected to said shafts and said bearings to resiliently resist rotative movement of said shafts in said bearings, and an elongated torsional member extending axially through said shafts and having its opposite ends secured to the outer ends of said shafts to resiliently resist relative rotation of said shafts with respect to each other.

FRANK F. LINN.

References Cited in the file of this patent

UNITED STATES PATENTS

| Number | Name | Date |
|---|---|---|
| 2,455,787 | Linn | Dec. 7, 1948 |
| 2,477,822 | Probst | Aug. 2, 1949 |
| 2,558,311 | Morrow | June 26, 1951 |

FOREIGN PATENTS

| Number | Country | Date |
|---|---|---|
| 521,753 | Great Britain | May 30, 1940 |
| 636,972 | Germany | Oct. 20, 1936 |
| 812,732 | France | Feb. 8, 1937 |